(12) United States Patent
Yoerg (10) Patent No.: US 7,347,165 B2
(45) Date of Patent: Mar. 25, 2008

(54) TORTOISE BATHING FACILITY

(76) Inventor: William G. Yoerg, P.O. Box 130971, Roseville, MN (US) 55113

( * ) Notice: Subject to any disclaimer, the term of this patent is extended or adjusted under 35 U.S.C. 154(b) by 95 days.

(21) Appl. No.: 11/333,047

(22) Filed: Jan. 17, 2006

(65) Prior Publication Data

US 2007/0163515 A1    Jul. 19, 2007

(51) Int. Cl.
*A01K 13/00*    (2006.01)
*A01K 29/00*    (2006.01)

(52) U.S. Cl. .......................... 119/671; 119/673; 119/675

(58) Field of Classification Search ................ 119/665, 119/668, 671, 673, 674, 675, 676, 753, 754, 119/755, 756
See application file for complete search history.

(56) References Cited

U.S. PATENT DOCUMENTS

| 2,264,201 | A | * | 11/1941 | Findlay | 119/665 |
| 4,407,234 | A | * | 10/1983 | Kleman | 119/672 |
| 4,505,229 | A | * | 3/1985 | Altissimo | 119/668 |
| 5,148,771 | A | * | 9/1992 | Schuett et al. | 119/479 |
| 5,193,487 | A | * | 3/1993 | Vogel | 119/671 |

* cited by examiner

*Primary Examiner*—T. Nguyen
(74) *Attorney, Agent, or Firm*—Jacobson and Johnson

(57) ABSTRACT

A pet bathing unit comprising a container for supporting a pet therein, the container having a base and at least one sidewall extending therefrom, a fluid conduit having at least one fluid jet nozzle extending therefrom and located proximal the base to provide for a steady fluid stream along the base of the container to clean the underside of the pet, a drain unit located on the base of the container to provide a path from the container to a sanitation outlet for the movement of fluids and particles therethrough, at least one pet supporting surface extending from the base, and a set of channels extending along the base of the container between the at least one fluid jet nozzle and the drain unit.

19 Claims, 12 Drawing Sheets

TORTOISE BATHING FACILITY

CROSS REFERENCE TO RELATED APPLICATIONS

None

FIELD OF THE INVENTION

This invention relates generally to pet care and, more specifically, to a bathing unit for turtles and tortoises.

STATEMENT REGARDING FEDERALLY SPONSORED RESEARCH OR DEVELOPMENT

None

REFERENCE TO A MICROFICHE APPENDIX

None

BACKGROUND OF THE INVENTION

Although it often can be fun and rewarding to raise and care for turtles and tortoises, one of the problems of raising turtles and especially tortoises is that they often require to be washed and/or bathe. It is noted that because turtles and tortoises absorb moisture through their skin to prevent dehydration, the term bathe or bathing also pertains to soaking in water which turtles and tortoises need to do ranging from daily intervals to most of the time. The problem with washing and bathing turtles and tortoises is that the turtles and tortoises often urinate and leave feces droppings during their time in the water which is why it is often undesired and unsanitary to place the turtles and tortoises in a household sink or tub for washing and bathing.

One solution to the above problem is to let the turtles and tortoises bathe in a separate container. However, the aforementioned is also undesirable as the pet owner usually has to come into contact with the dirty water in order to remove the turtles and tortoises from the container. In addition, it can also be a messy proposition in removing the dirty water from the container and cleaning the out container.

SUMMARY OF THE INVENTION

The present invention provides a unit for bathing and washing pets such as turtles and tortoises comprising a container for supporting the tortoises and turtles therein. The container includes a base and at least one sidewall extending therefrom and a fluid conduit having a plurality of fluid jet nozzles extending from the fluid conduit. The fluid jet nozzles are positioned proximal the base of the container and provide for a steady fluid stream along the base of the container for cleaning the tortoises and turtles. The pet bathing and washing unit also includes a drain unit located on the base of the container, the drain unit providing a path from the container to a sanitation outlet for the movement of fluids and particles therethrough. The drain unit includes an extendable outlet tube connected to the drain unit to allow the pet bathing and washing unit to be positioned at a spaced location from the sanitation outlet.

The pet bathing and washing unit of the present invention also includes a plurality of supporting surfaces extending from the base for supporting the tortoises and turtles thereon. Preferably located between the supporting surfaces are channels that extend along the base of the container between the set fluid jet nozzles and the drain unit. The channels function to direct the fluid stream along with feces and dirt carried by the fluid stream towards the drain unit. The pet bathing and washing unit also includes a set of water deflecting members protruding from the base of the container for removing feces and dirt clinging to the feet of the tortoises and turtles. The water deflecting members also function to deflect a portion of the fluid stream upwards to further clean the turtles and tortoises. The pet bathing and washing unit can further include a stand for supporting the container in an elevated condition.

DESCRIPTION OF THE INVENTION

Figure 1:
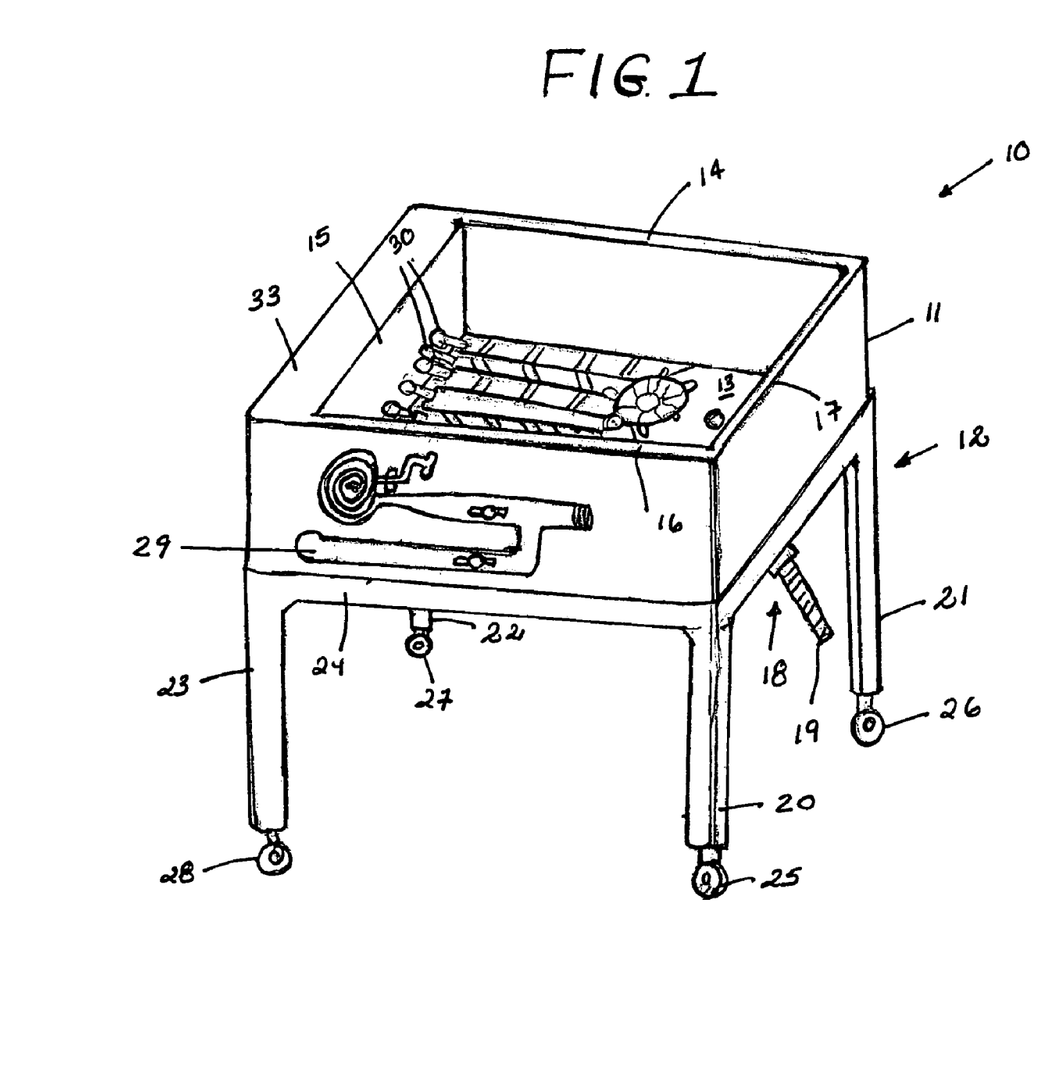
FIG. 1 is a perspective view of a pet-bathing unit of the present invention.

Referring to FIG. 1, FIG. 1 is a perspective view showing a pet-bathing unit 10 of the present invention for allowing pet owners to bathe their pets therein and later clean the pet-bathing unit 10 without having to come into contact with the potentially unsanitary leftover water. Although the present invention can be used to bathe and/or wash different types of pets including small dogs, cats, and birds, the present invention is preferably used for aquatic pets such as turtles and tortoises. As such, the use of the present invention for bathing and washing turtles and tortoises will be described hereafter.

As shown in FIG. 1, the pet-bathing unit 10 of the present invention comprises two parts, namely a container 11 for holding the turtles and tortoises therein and a stand 12 for supporting the container 11 in an elevated condition. In regards to the container 11, container 11 comprises a base 13 having at least one sidewall extending therefrom. Referring to the embodiment of FIG. 1, note that although container 11 is shown as comprising a rectangular shaped body having four (4) sidewalls 14, 15, 16, and 17 extending from the base 13 of the container 11, the container of the present invention is not limited to a rectangular shaped body and alternatively can comprises a square, oval, or circular shaped body.

The container 11 includes a drain unit 18 located on base 13 of the container 11, drain unit 18 providing a path for the movement of fluids and particles, including animal wastes, from the interior of container 11 to a sanitation outlet. It is noted that the term sanitation outlet is used to describe various types of outlet that leads to a sewer or sanitation system and includes but is not limited to a toilet, a sink, and a bathtub.

Drain unit 18 includes an extendable outlet tube 19 connected thereto with extendable outlet tube 19 allowing for the placement of the pet-bathing unit 10 at a spaced location from the sanitation outlet while still being able to empty water and particles from the interior of the container 11 to sanitation outlet at the aforementioned spaced location.

In regards to the stand 12 of the pet bathing unit 10, the stand 12 comprises a platform 24 having four (4) legs 20, 21, 22, and 23 extending therefrom with the platform 24 and the legs 20, 21, 22, and 23 collectively forming a frame for receiving and supporting the container 11. The stand 12 includes a wheel 25, 26, 27, and 28 connected to each of the legs 20, 21, 22, and 23 at an end of the legs that are distal to the platform 24 with wheels 25, 26, 27, and 28 providing for the movement of the pet-bathing unit 10 from a first location to a second location while helping to minimize the splashing of fluid in the container during the trip. That is, the wheels 25, 26, 27, and 28 allow the pet-bathing unit 10 to be rollingly transferred from a first located at which the turtles and tortoises are washed and allowed to swim and bathe to a second location at which the fluids and particles in the container 11 of the pet bathing unit 10 are removed. Although not shown each of the wheels 25, 26, 27, and 28 can include a locking mechanism to prevent their rolling so as to maintain the pet-bathing unit 10 at a stationary location when desired. It is noted that although FIG. 1 shows the stand 12 having four (4) legs 20, 21, 22, and 23, alternative embodiments can include a stand having as few as one (1) leg to a plurality of legs.

Referring again to FIG. 1, another feature of pet-bathing unit 10 is that the pet-bathing unit 10 includes a fluid conduit 29 having at least one fluid jet nozzle and more preferably a plurality of fluid jet nozzles 30 extending from the fluid conduit 29. Fluid jet nozzles 30 preferably are located proximal the base 13 of the container 11 and provide for a steady fluid stream along the base 13 of the container 11 to clean the turtles and tortoises, including the underside of the turtles and tortoises. In the embodiment of the pet-bathing unit 10 of FIG. 1, a portion of the fluid conduit 29 is shown located on the exterior surface of sidewall 16 while the remainder portion of the fluid conduit 29 is supported within a housing 33.

Figure 2:
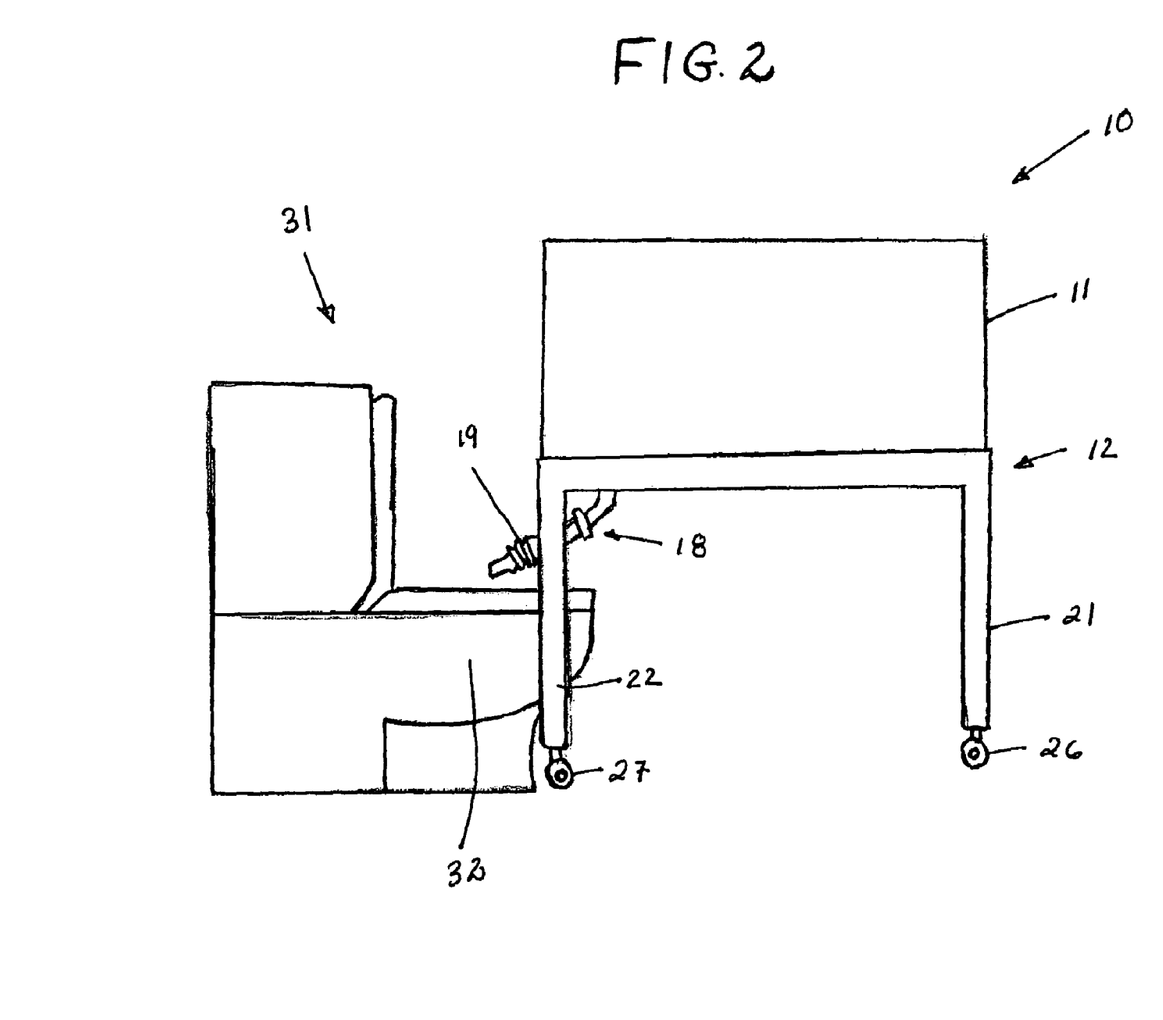
FIG. 2 is a side view of the pet-bathing unit of FIG. 1.

FIG. 2 is a side view showing the pet-bathing unit 10 of FIG. 1 in a working condition, with stand 12 supporting the container 11 over a portion of a toilet bowl 32 of a toilet 31. Note that a portion of drain unit 18, and more specifically the extendable outlet tube 19 of drain unit 18, is shown extending over and partially into toilet bowl 32. The extension of the drain unit 18 over and partially into the toilet bowl 32 allows fluids and particles located within the container 11 to be emptied from container 11 into the toilet bowl 32 with minimal spillage and splashing.

Figure 3:
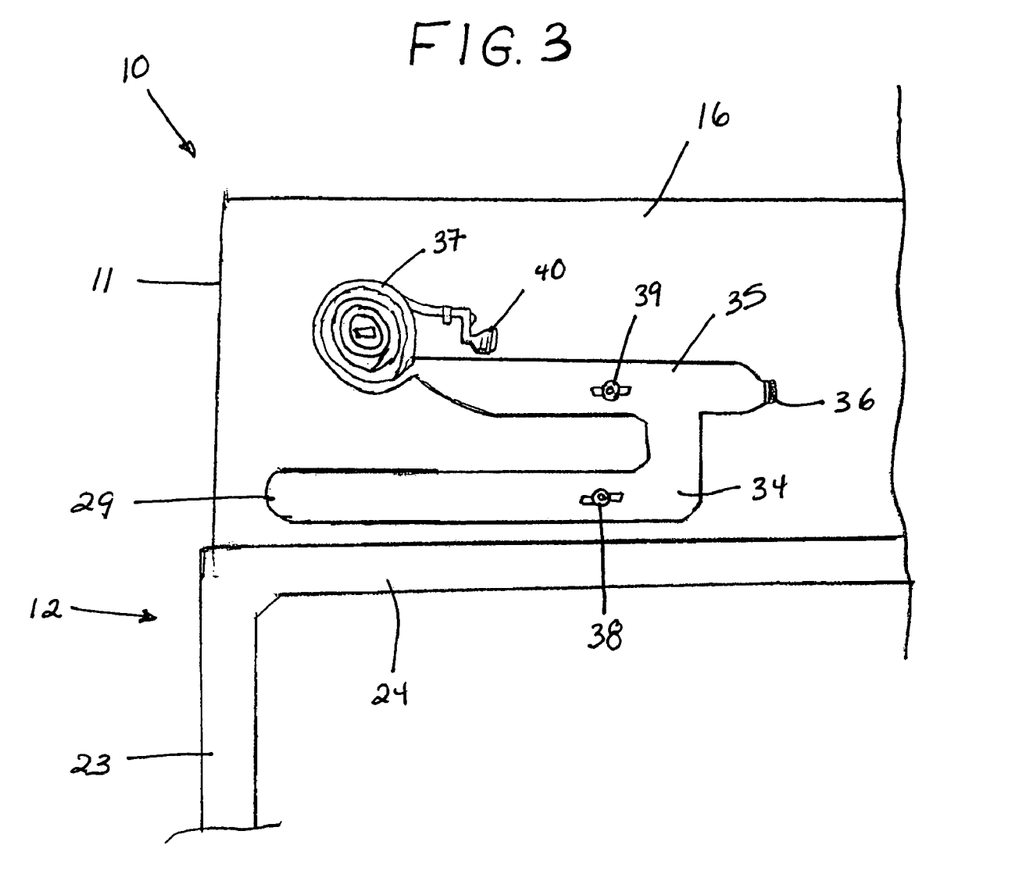
FIG. 3 is a close-up partial side view of the pet-bathing unit of FIG. 1.

FIG. 3 shows a close-up partial side view of the portion of fluid conduit 29 supported on the exterior sidewall 16 of the pet-bathing unit 10 of FIG. 1. In regards to fluid conduit 29, fluid conduit 29 is shown in FIGS. 1 and 3 as including a main fluid line 34 that directs the majority of the fluid entering fluid conduit 29 via a conduit inlet 36 to fluid jet nozzles 30 and a secondary line 35 that directs a portion of the fluids entering fluid conduit 29 via conduit inlet 35 to a fluid hose 36 extending from the fluid conduit 29. The fluids directed to fluid hose 36 allow for a pet owner to further clean the turtles and tortoises along with the container once the turtles and tortoise are finishes using pet-bathing unit 10. Fluid conduit 29 is also shown in FIGS. 1 and 3 as also having a first dial 38 for controlling the flow of fluids through main fluid line 34 and a second dial 39 for controlling the flow of fluid through secondary fluid line 35. Note that hose 37 can also include a water spray 40 connected thereto to provide for increased water spraying pressure.

Figure 4:
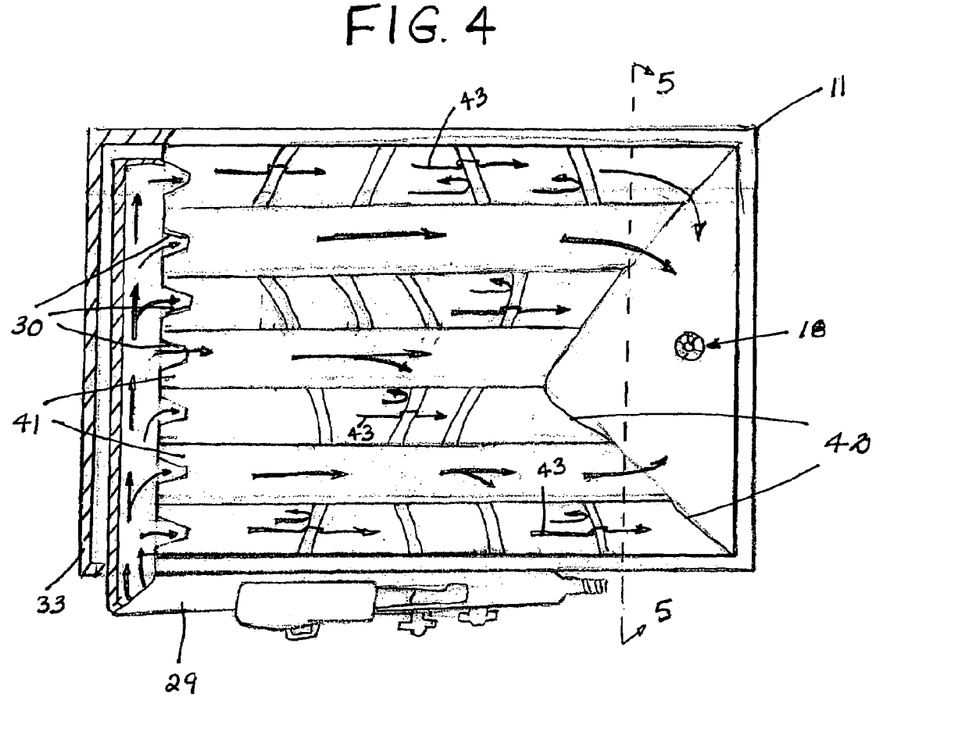
FIG. 4 is a partial cross-sectional top view of the container of the pet-bathing unit.
Figure 5:
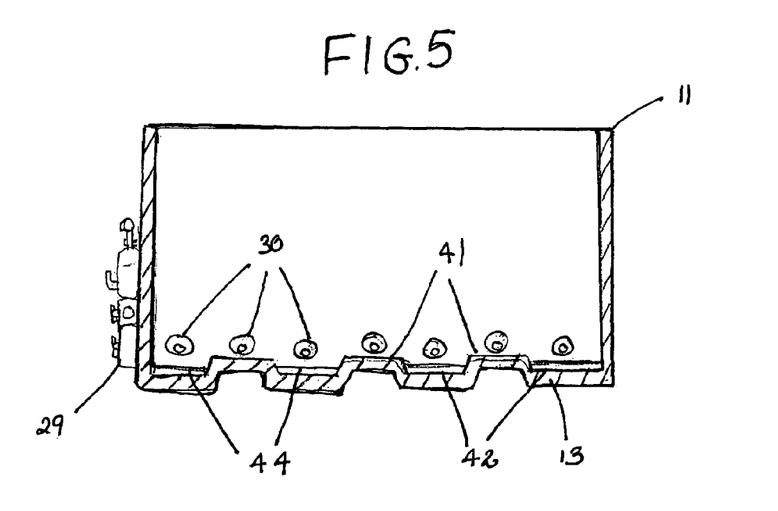
FIG. 5 is a cross-sectional view of container taken along lines 5-5 of FIG. 4.

FIG. 4 is a partial cross-sectional view of the top of container 11 and FIG. 5 is a cross-sectional view of container 11 taken along lines 5-5 of FIG. 4. FIGS. 4 and 5 show another feature of the present invention in that the pet-bathing unit 10 includes at least one pet-supporting surface and preferably a plurality of pet supporting-surfaces 41 extending from the base 13 of container 11 for supporting the turtles and tortoises thereon as they bathe.

Pet-bathing unit 10 also includes a set of channels 42 located along the base 13 of the container 11 and running between the set of fluid jet nozzles 30 and the drain unit 18 for directing a fluid stream 43 towards the drain unit 18. Preferably, each of the channels of the set of channels 42 are positioned between two pet-supporting surfaces 41 with the channels 42 each sized sufficiently narrow to allow a turtle or tortoise to support themselves on at least two of the pet-supporting surfaces 41. The aforementioned will thus allow at least one of the channels 42 to be positioned under the turtle or tortoise so that a portion of the fluid stream 43 directed by the channel 42 engages and cleans the underside of the turtle or tortoise.

Another feature of the present, also shown in FIGS. 4 and 5, is that container 11 also includes a set of fluid-deflecting members 44 protruding upwards from the base 13 of container 11. The fluid-deflecting members 44 serve the dual purpose of functioning not only to remove feces and dirt clinging to the feet of the turtle or tortoise but also to deflect a portion of the fluid stream 43 moving along the channels 42 upwards to further clean the turtle or tortoise.

Figure 6:
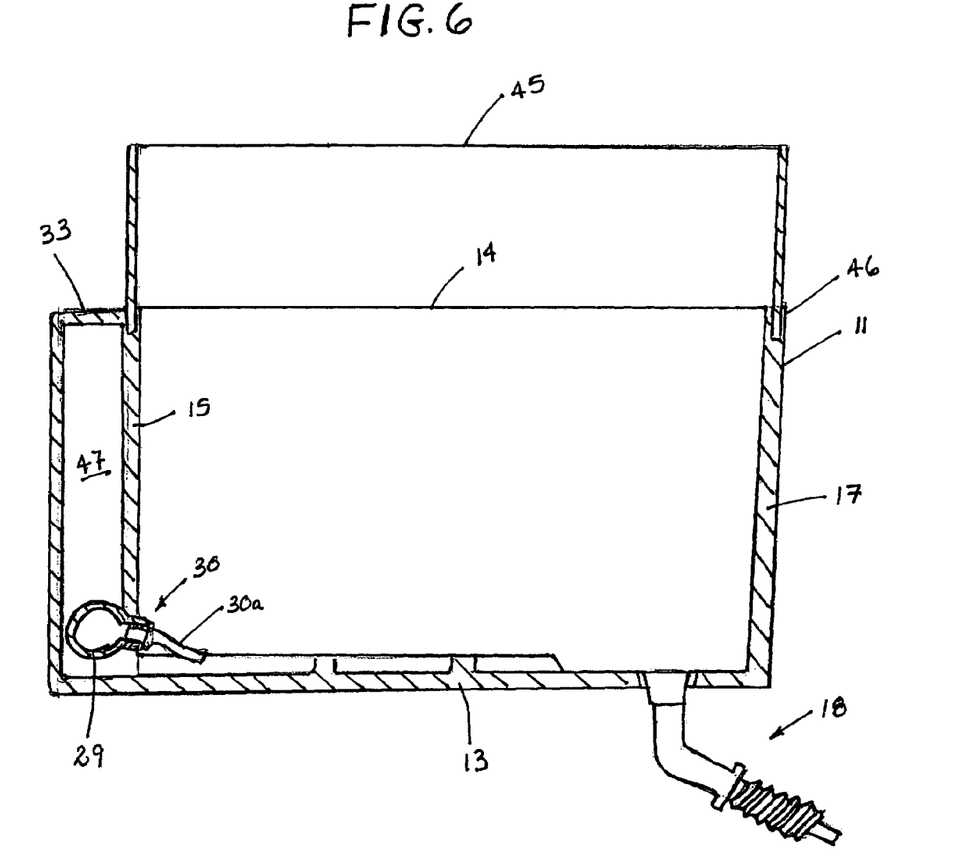
FIG. 6 shows a cross-sectional end-to-end view of a container having a splashguard attached to the sidewalls of the container.
Figure 7:
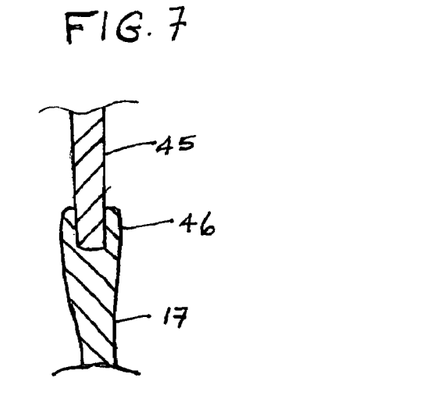
FIG. 7 is a blow-up view showing the connection between the splashguard and the sidewall of the container.

Referring to FIGS. 6 and 7, FIG. 6 shows a cross-sectional end-to-end view of container 11 having a splashguard 45 attached to the sidewalls 14, 15, and 17 of the container 11 and FIG. 7 is a blow-up cross-sectional view showing the connection between the splashguard 45 and the sidewall 17 of container 11.

As shown in the embodiment of FIG. 6, the sidewalls 14, 15, 16, and 17 of container 11 can include a member for securing splashguard 45 thereto. Although the member for securing the splashguard 45 to the container 11 can comprise various types of articles capable of securing a portion of the splashguard 42 to the wall of the container 11 including but not limited to various fasteners and clamps, the embodiment of FIGS. 6 and 7 show the member for securing the splashguard 45 to the sidewall 14, 15, 16, and 17 of the container 11 as comprising a slip-pin hinge 46 located proximal the edge of the sidewalls 14, 15, 16, and 17. Alternatively, it is noted that the member for securing the splashguard to the sidewall of the container alternatively can comprise a slot or recess located in, on, or extending from the sidewalls.

In further regards to FIG. 6, note that FIG. 6 also shows jet nozzle 30 extending from the portion of fluid conduit 29 located in housing 33, and more specifically, a chamber 47 of housing 33.

Figure 8:
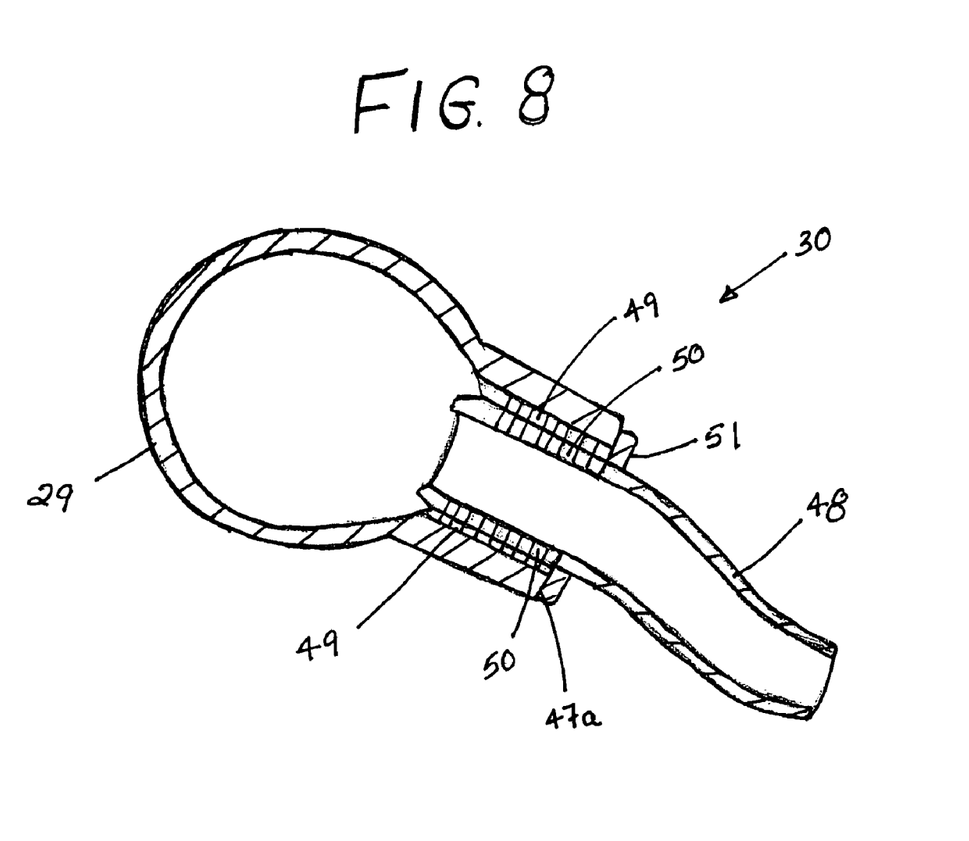
FIG. 8 shows a close-up cross-sectional view of the individual parts of a jet nozzle.

FIG. 8 shows a close-up cross-sectional view of the individual parts of jet nozzle 30. Jet nozzle 30, as shown in the embodiment of FIG. 8, preferably comprises a tubular shaped member 47 integrally extending from fluid conduit 29 and a fluid jet attachment 48. Fluid jet attachment 48 is preferable made from a rust-resistant bendable rigid material such as but is not limited to copper and can comprise of a plurality of shapes and sizes. Located on a portion of an interior surface of tubular member 47 are female threads that are rotatively engagable with male threads 50 located on a portion of an exterior surface of the fluid jet attachment 48. The rotative engagement of the male threads of the fluid jet attachment 48 with the female threads of the tubular member 47 allow for a fluid-tight attachment of the fluid jet attachment 48 to the tubular member 47. Note that FIG. 8 also shows a sealing washer 51 extending from the exterior surface of fluid jet attachment 48 for engaging an end 47a of the tubular member 47. Sealing washer 51 serves the dual purpose of not only providing a visual indicator of when fluid jet attachment 48 is completely attached to tubular member 47 but also to further seal the connection between fluid jet attachment 48 to the tubular member 47.

Figure 9:
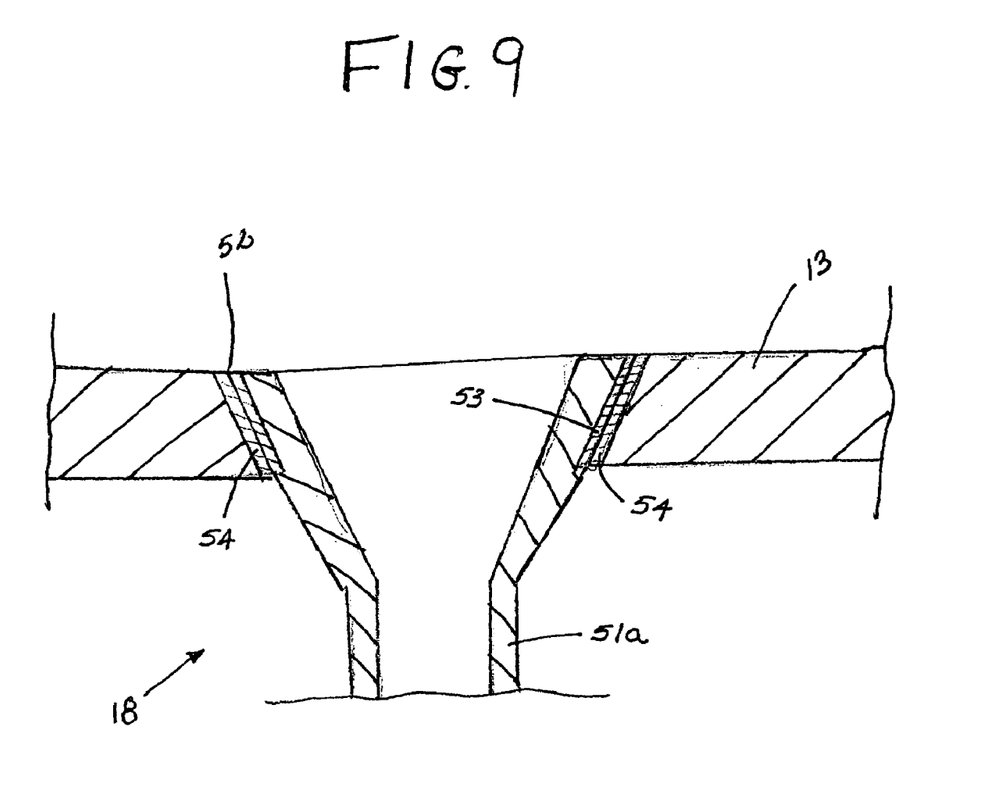
FIG. 9 shows a cross-sectional partial view of the drain unit of the pet-bathing unit.

FIG. 9 shows a cross-sectional partial view of the drain unit 18 for the pet-bathing unit 10. The drain unit 18, as shown in FIG. 9, comprises a pipe 51a extending from the base 13 of the container 11. It is noted that pipe 51a can be manufactures as an integral part of the container 11 or alternative manufactured separate from the container 11 and assembled after purchase. In the instances, as shown in Figure, in which pipe 51a is assembled after purchased, pipe 51a can include male threads 53 located on a portion of an exterior surface of the pipe 51a for rotating engagement with female threads 54 extending from an orifice 52 located on a portion of the base 13 of the container 11 to provide for a fluid-tight connection between pipe 51a and the base 13 of the container 11.

Figure 10:
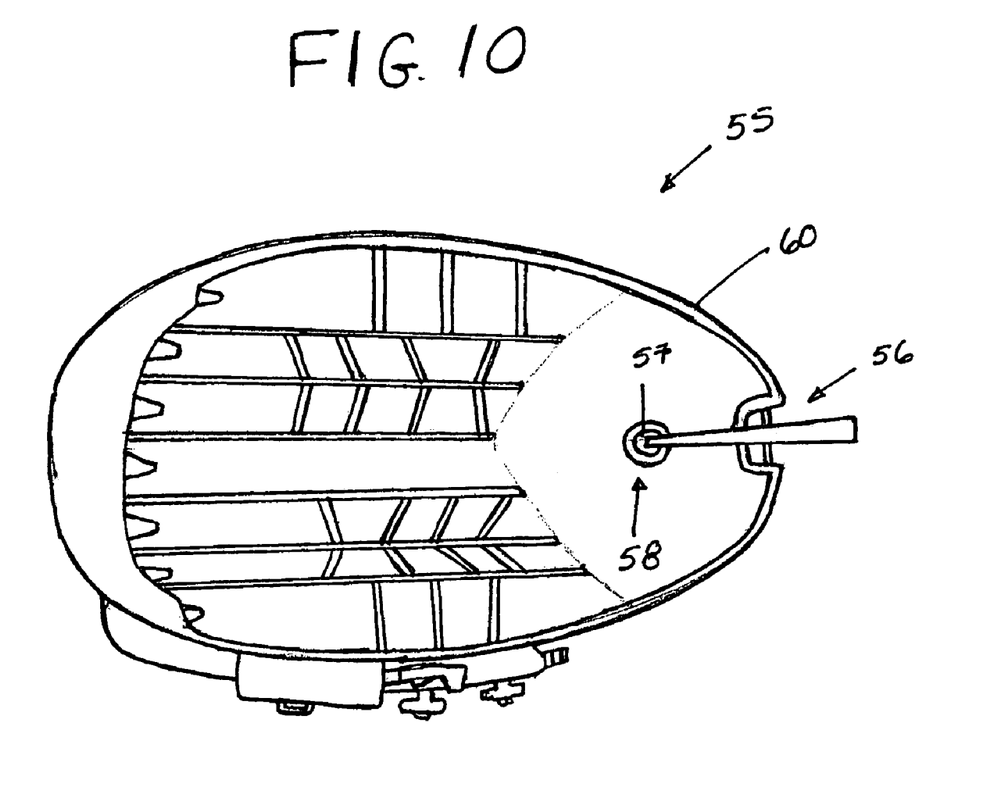
FIG. 10 shows an oval shaped pet-bathing unit having a pivotable drain plug assembly for lodging and dislodging the drain plug from the drain unit.
Figure 11:
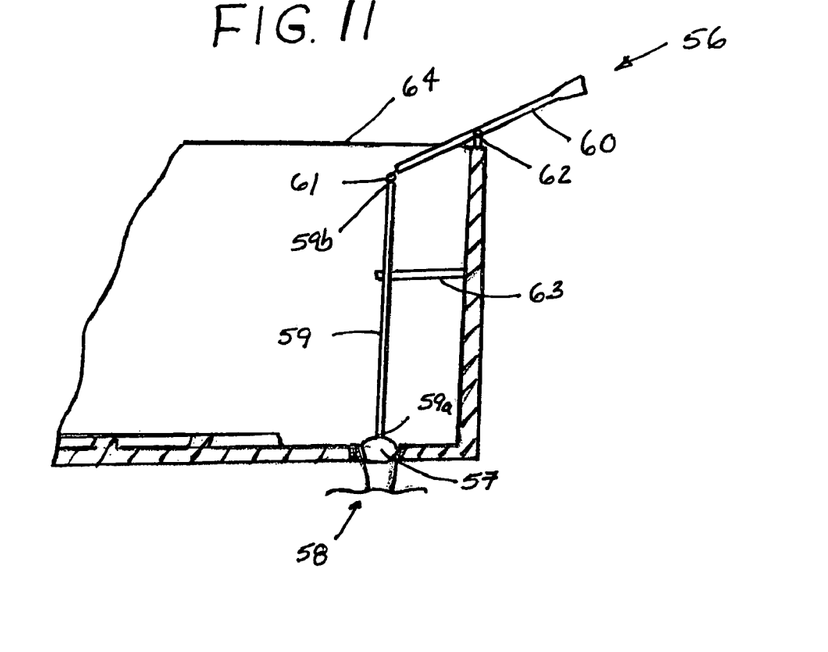
FIG. 11 is a cross-sectional view of a pivotable drain plug assembly.

Referring to FIGS. 10 and 11, FIG. 10 shows an alternative embodiment of the pet-bathing unit of the present invention comprising an oval shaped pet-bathing unit 55 having a drain plug 57 that includes a pivotable drain plug assembly 56 for lodging and dislodging drain plug 57 from the drain unit 58.

FIG. 11 is a cross-sectional view of the pivotable drain plug assembly 56 of FIG. 10. Pivotable drain plug assembly 56 generally comprises a shaft 59 having a first end 59a attached to drain plug 57 and a second end 59b attached to pivotable lever 62. Pivotable lever 62 is shown support of a portion of a container 64 by pin 62 extending therethrough with pivotable lever 62 preferably attached to shaft 59 via a riveted attachment 61. As shown in FIG. 11, pivotable drain plug assembly 56 also includes the use of a support bar 63 for maintaining and supporting the position of shaft 50 and in turn drain plug 57 with respect to drain unit 58.

Figure 12:
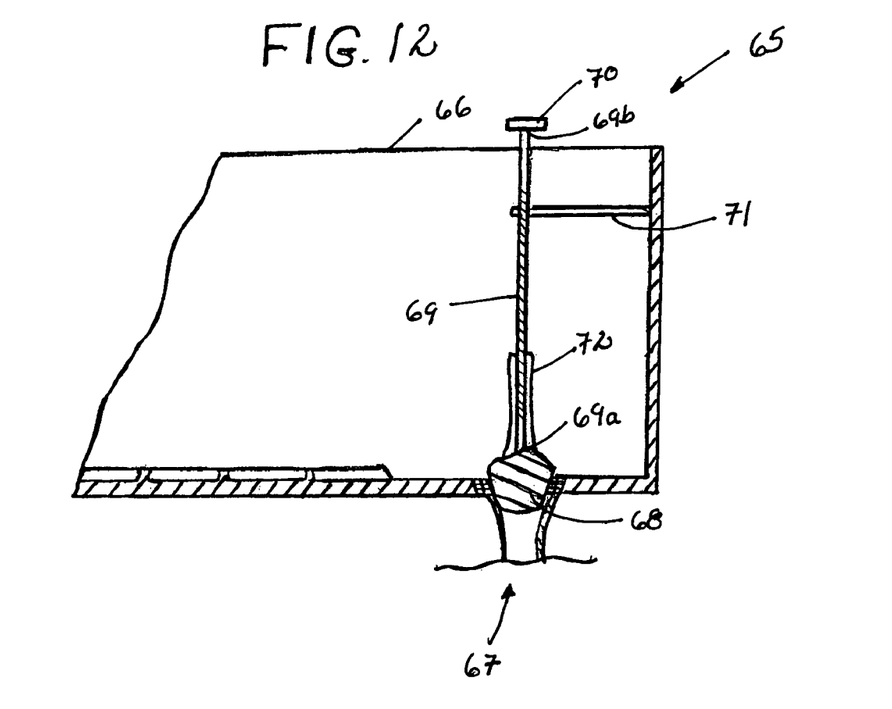
FIG. 12 is a cross-sectional view showing an adjustable drain plug assembly for controlling the blockage of the drain unit by a plug.
Figure 13:
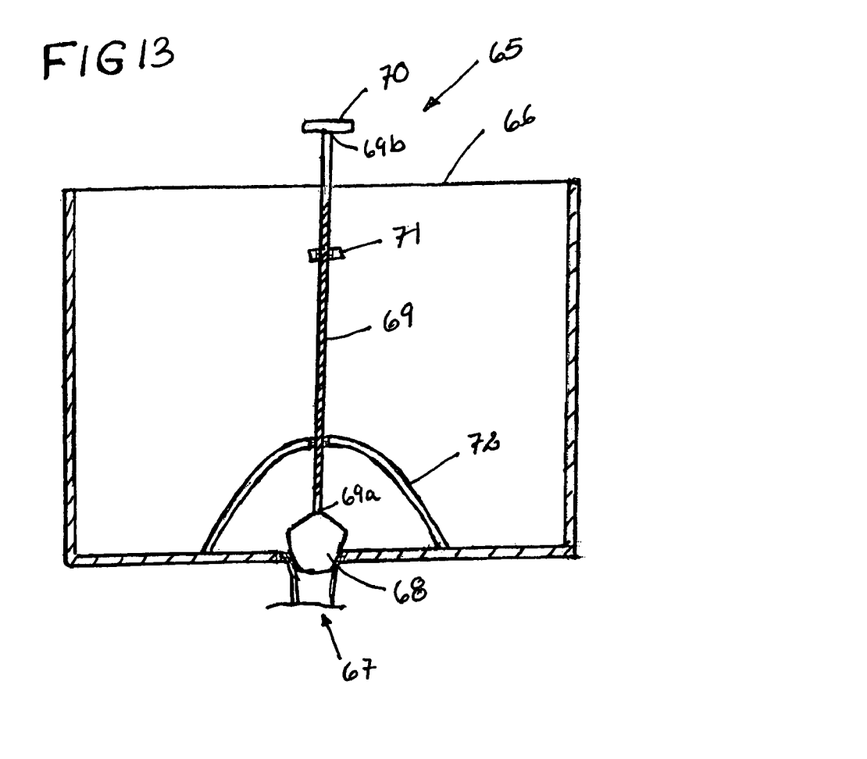
FIG. 13 is a cross-sectional view of an adjustable drain plug assembly for controlling the blockage of the drain unit by a plug.

Referring to FIGS. 12 and 13, FIGS. 12 and 13 are cross-sectional views showing an adjustable drain plug assembly 65 for controlling the blockage of a drain unit 67 by a plug 68 to thereby control drainage rate of fluids from the container 66. Adjustable drain plug assembly 65 generally comprises a threaded shaft 69 having a first end 69a attached to drain plug 68 and a second end 69b attached to a rotatable handle 70. Threaded shaft 69 is shown support by not only a support bar 71 but also by a bridge member 71 for maintaining and supporting the position of shaft 50 and in turn drain plug 57 with respect to drain unit 58 and in turn the blockage of a drain unit 67 by a plug 68 to thereby control drainage rate of fluids from the container 66.

Figure 14:
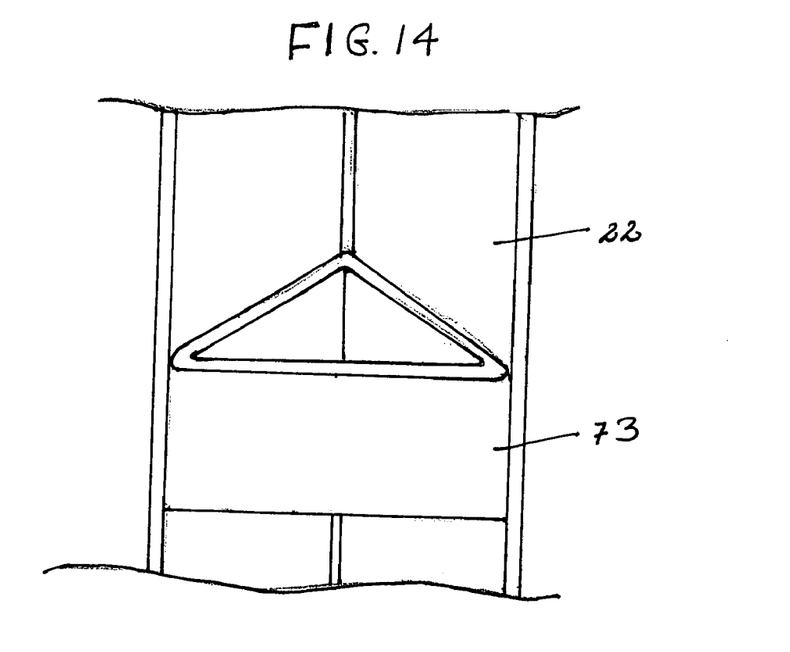
FIG. 14 is a close-up view of a corner tray for collecting post-drained fluids from the drain unit.

FIG. 14 is a close-up view of an addition feature of the present invention, namely a corner tray 73 removably attachable to the leg 22 of stand 12 of pet-bathing unit 10. Corner tray 73 functions to collect post-drained fluids from the drain unit 18 via the extendable outlet tube 19. More specifically, after the container 11 of the pet-bathing unit 10 is drained of fluid, left over waste fluid might still be present in the drain unit 18. Vibrational forces cause by the movement the pet-bathing unit 10, such as to a storage location, can cause the left over waste fluids to drip out of the drain unit 18 onto the floor, which can be unsanitary. To solve the aforementioned problem, the user can position the extendable outlet tube 19 of the drain unit 18 over corner tray 73 so that corner tray 73 is able to collect any left over waste fluid that drips from drain unit 18. After the left over waste fluids are collected by corner tray 73, corner tray 73 can then be easily removed from stand 12 so that the left over waste fluids can be emptied and corner tray 73 cleaned.

Figure 15:
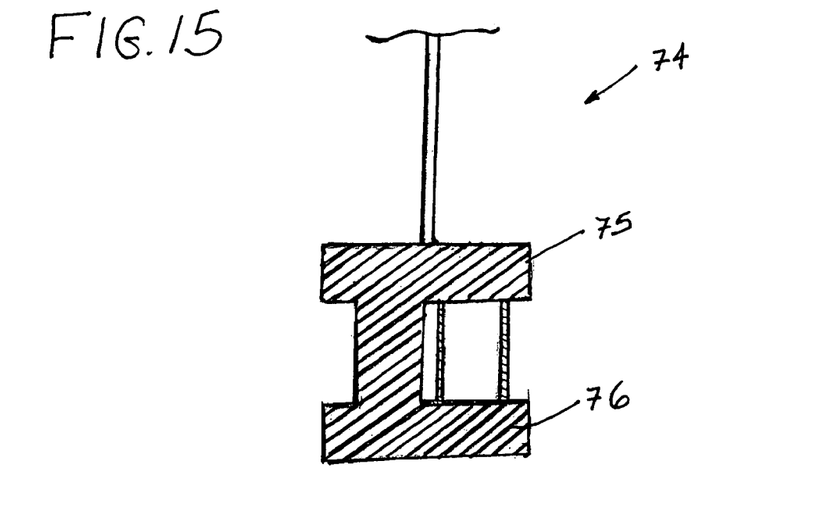
FIG. 15 shows an adjustable drain plug assembly for controlling the drainage rate of fluids from a container of a pet-bathing unit.
Figure 16:
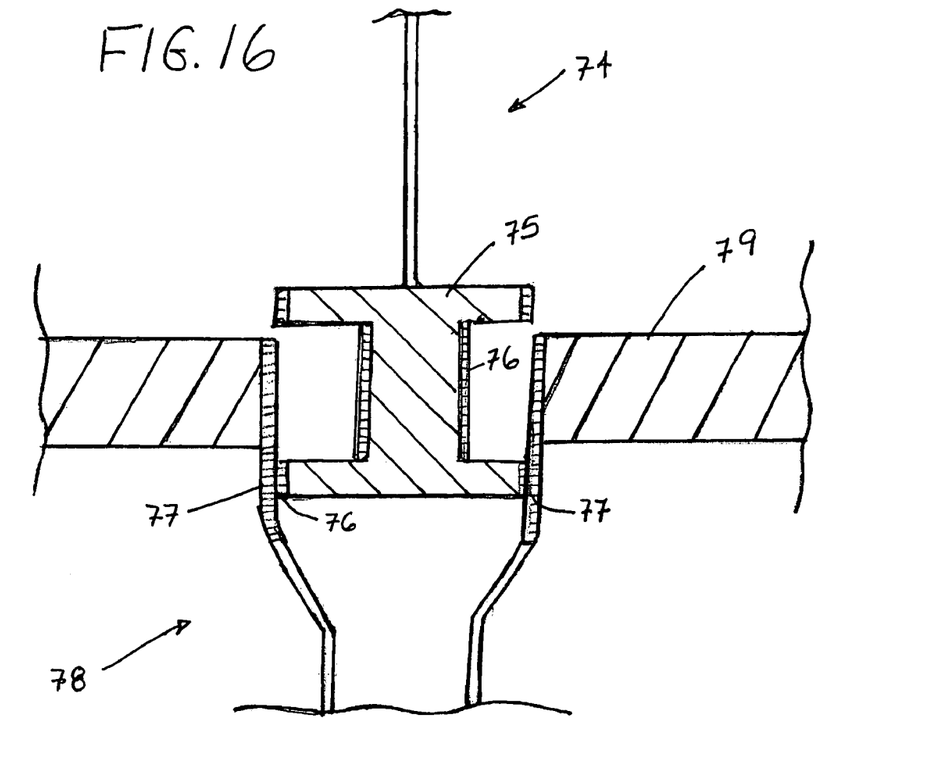
FIG. 16 is a cross-sectional view of the adjustable drain plug assembly of FIG. 15 in use.

Referring to FIGS. 15 and 16, FIGS. 15 and 16 show an adjustable drain plug assembly 74 that includes a flexible plug 75 having a partially hollow interior and a threaded exterior 76 matingly engagable with a threading 77 of a drain unit 78 for controlling the drainage rate of fluids from a container 79 of a pet-bathing unit of the present invention.

Figure 17:
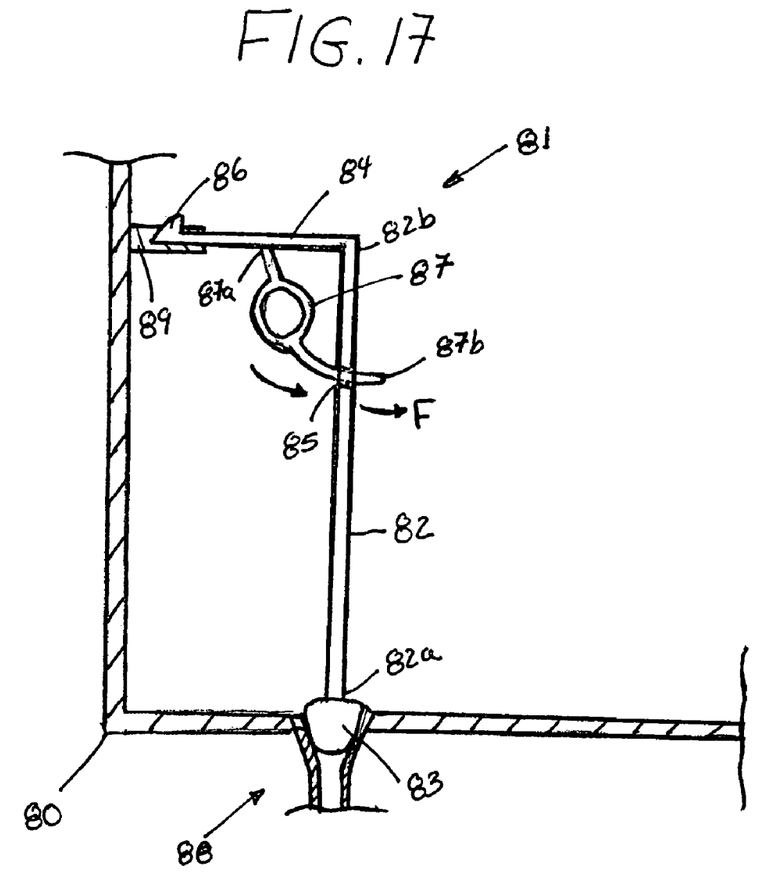
FIG. 17 is a cross-sectional view of a container of the present invention having a finger triggered locking drainage assembly.

FIG. 17 is a cross-sectional view of a container 80 of the present invention having a finger triggered locking drainage assembly 81. Finger triggered locking drainage assembly 81 generally comprises a shaft 82 having a first end 82a attached to drain plug 83 and flexible arm 84 extending substantially perpendicular from a second end 82b of shaft 82 with flexible arm 84 including a hook end 86. Shaft 82 also includes an orifice 85 extending through a portion of the shaft. Finger triggered locking drainage assembly 81 also includes a finger trigger 87 having a first end 87a attached a portion of flexible arm 84 and a second end 87b extending through the orifice of shaft 82. In use, drain plug 83 engages a drain unit 88 and is lockingly secured thereto by the engagement of the hook end 85 of the triggered locking drainage assembly 81 to a securing site 89 located on the container 80. To unplug drain unit 88 of plug 83, flexible arm 84 is bent via finger trigger 87 in order to release the hook end 86 of flexible arm 84 from the securing site 89 of the container 80 to thereby release the locking drainage assembly 81.

I claim:

1. A pet bathing unit comprising:
   a container for supporting a pet therein, the container having a base and at least one sidewall extending therefrom;
   a fluid conduit having at least one fluid jet nozzle extending therefrom, the at least one fluid jet nozzle located at the base and providing for a steady fluid stream flowing along the base of the container to clean the underside of the pet;
   a drain unit located on the base of the container, the drain unit providing a path from the container to a sanitation outlet for the movement of fluids and particles therethrough, the drain unit including an extendable and contractable outlet tube connected thereto to allow the positioning of the pet bathing unit at a spaced condition from the sanitation outlet;

at least one pet supporting surface extending from the base; and a plurality of channels defining the base of the container and extending between the at least one fluid jet nozzle and the drain unit.

2. The pet bathing unit of claim 1 including a set of water deflecting members protruding from the base of the container, the water deflecting members functioning to remove feces and dirt clinging to the feet of a pet while also deflecting a portion of the fluid stream upwards to further clean the pet.

3. The pet bathing unit of claim 1 wherein the at least one fluid jet nozzle comprises a plurality of fluid jet nozzle.

4. The pet bathing unit of claim 1 wherein the sidewalls of the container include a member for securing a splashguard thereto.

5. The pet bathing unit of claim 1 including a fluid hose extending from the fluid conduit for further cleaning the pet and the container.

6. The pet bathing unit of claim 1 wherein the container comprises a square, rectangle, oval, or circular shaped body.

7. The pet bathing unit of claim 1 wherein the drain unit includes an adjustable drain plug for controlling the drainage rate of fluids from the container.

8. The pet bathing unit of claim 1 including a stand for supporting the container in an elevated condition.

9. The pet bathing unit of claim 8 wherein the stand includes wheels for moving the pet bathing unit between locations.

10. The pet bathing unit of claim 9 including a corner tray removably attachable to a leg of the stand for collecting post-drained fluids from the extendable and contractable outlet tube.

11. The pet bathing unit of claim 1 including a drain plug having a pivotable assembly for lodging and dislodging the drain plug from the drain unit.

12. The pet bathing unit of claim 1 wherein the at least one pet supporting surface comprises a plurality of pet supporting surfaces with each channel of the set of channels is position between two pet supporting surfaces for directing the fluid stream towards the drain unit.

13. A pet bathing unit comprising:

a container for supporting a pet therein, the container having a base and at least one sidewall extending therefrom;

a fluid conduit having a fluid jet nozzle extending therefrom, the fluid jet nozzle located at the base and providing for a steady fluid stream flowing along the base of the container to clean the underside of the pet;

a drain unit located on the base of the container, the drain unit providing a path from the container to a sanitation outlet for the movement of fluids and particles therethrough;

a set of pet supporting surfaces extending from the base;

a plurality of channels defining the base of the container and extending between the set of fluid jet nozzles and the drain unit, the channels directing the fluid stream towards the drain unit; and a set of water deflecting members protruding from the base of the container, the water deflecting members removing feces and dirt clinging to the feet of the pet while also deflecting a portion of the fluid stream upwards to clean the underside of the pet.

14. The pet bathing unit of claim 13 including a stand for supporting the container in an elevated condition.

15. The pet bathing unit of claim 13 wherein the set of water deflecting members are located within the set of channels.

16. The pet bathing unit of claim 13 wherein the drain unit includes an extendable and contractable outlet tube connected thereto, the extendable and contractable outlet tube allowing the positioning of the pet bathing unit at a spaced condition from the sanitation outlet.

17. The pet bathing unit of claim 13 wherein the drain unit includes an adjustable drain plug having a partially hollow interior and a threaded exterior matingly engagable with a threading of the drain unit for controlling the drainage rate of fluids from the container.

18. The pet bathing unit of claim 13 wherein each channel of the set of channels is position between two pet-supporting surfaces.

19. A tortoise and turtle bathing unit comprising:

a container for supporting tortoises and turtles therein, the container having a base and at least one sidewall extending therefrom;

a fluid conduit having a plurality of fluid jet nozzles extending therefrom, the fluid jet nozzles located at the base and providing for a steady fluid stream flowing along the base of the container to clean the underside of the tortoises and turtles;

a drain unit located on the base of the container, the drain unit providing a path from the container to a sanitation outlet for the movement of fluids and particles therethrough;

an extendable and contractable outlet tube connected to the drain unit for allowing the positioning of the pet bathing unit at a spaced condition from the sanitation outlet;

a set of tortoises and turtles supporting surfaces extending from the base;

a plurality of channels defining the base of the container and extending between the set fluid jet nozzles and the drain unit with each channel positioned between two tortoises and turtles supporting surfaces for directing the fluid stream towards the drain unit;

a set of water deflecting members protruding from the base of the container, the water deflecting members removing feces and dirt clinging to the feet of the tortoises and turtles while also deflecting a portion of the fluid stream upwards to clean the underside of the tortoises and turtles; and a stand for supporting the container in an elevated condition.

* * * * *